US006746071B2

(12) United States Patent
Farino (10) Patent No.: US 6,746,071 B2
(45) Date of Patent: Jun. 8, 2004

(54) VEHICLE THEFT PREVENTION DEVICE

(76) Inventor: Joseph Farino, 96 Cloverdale Rd., Clifton, NJ (US) 07013

( * ) Notice: Subject to any disclaimer, the term of this patent is extended or adjusted under 35 U.S.C. 154(b) by 0 days.

(21) Appl. No.: 10/643,541

(22) Filed: Aug. 19, 2003

(65) Prior Publication Data

US 2004/0036309 A1 Feb. 26, 2004

Related U.S. Application Data

(63) Continuation-in-part of application No. 10/222,833, filed on Aug. 19, 2002.
(51) Int. Cl.[7] .................................................. B60N 2/02
(52) U.S. Cl. ............................... 296/65.16; 297/378.14; 297/341; 70/261; 296/1.05
(58) Field of Search .......................... 296/65.15, 65.16, 296/68.1, 1.05; 297/217.3, 378.14, 378.12, 341; 70/261, 211, 237

(56) References Cited

U.S. PATENT DOCUMENTS

| | | | | |
|---|---|---|---|---|
| 5,415,458 A | * | 5/1995 | Kim ....................... | 297/378.14 |
| 5,529,372 A | * | 6/1996 | Cohen ..................... | 297/217.3 |
| 5,628,215 A | * | 5/1997 | Brown .................... | 297/378.14 |
| 5,918,940 A | * | 7/1999 | Wakamatsu et al. ... | 297/378.12 |
| 6,048,019 A | * | 4/2000 | Tauber .................... | 296/65.13 |
| 6,382,694 B1 | * | 5/2002 | Rankin et al. ........... | 296/65.16 |

* cited by examiner

*Primary Examiner*—Lori L. Coletta
(74) *Attorney, Agent, or Firm*—Arnold D. Litt

(57) ABSTRACT

A theft prevention device includes a security module integrated with the powered seat system. The security module is programmed to instruct the powered seat system to move the vehicle seat between an original position and a forward security position with the seat member and lumbar support member moved forward to prevent a thief from accessing the passenger compartment of the vehicle. The theft prevent device further includes a gearing mechanism linking the seat member and the lumbar support member for controlled forward movement of the lumbar support member to a fully forward position flush with a forward most position within a passenger compartment of the vehicle. The theft prevent device further includes further includes a trigger switch linked to the security module for sending a trigger event signal instructing the security module when an individual leaves the vehicle or when an individual returns to the vehicle. Initiation of the first trigger event signal causes the security module to instruct the powered seat system to move the seat member forward along the guide rails and rotate the lumbar support member forward from its original position to a forward security position, and initiation of the second trigger event signal causes the security module to instruct the powered seat system to move the seat member and lumbar support member back to their original positions.

23 Claims, 6 Drawing Sheets

VEHICLE THEFT PREVENTION DEVICE

CROSS-REFERENCE TO RELATED APPLICATION

This application relates to the inventor's own U.S. Pat. Nos. 5,644,937 and 6,074,009, which are incorporated herein by reference. This application is a continuation-in-part of U.S. patent application Ser. No. 10/222,833, entitled "VEHICLE THEFT PREVENTION DEVICE", filed Aug. 19, 2002, which is currently pending.

BACKGROUND OF THE INVENTION

1. Field of the Invention

The invention relates to a vehicle theft prevention device. More particularly, the invention relates to a vehicle theft prevention device which locks the vehicle seat and/or the lumbar support member in a forward position to prevent access to the seating area by a would-be thief. As a result, the would-be thief is denied access to the front instrument panel and dashboard, and is not able to drive the car, open the glove compartment, remove the stereo, or steal other objects which might interest the thief.

2. Background of the Invention

Car theft has become a major problem throughout the United States, and many products have been developed to prevent and deter would-be thieves from stealing automobiles and the goods stored therein.

The vast majority of products are releasably secured to the control functions of the automobile when the owner leaves the automobile, and are intended to prevent a thief from using the car in a conventional manner. For example, bars may be secured to the steering wheel in a manner preventing a thief from properly steering. Similarly, a rod may be positioned between the steering wheel and the brake pedal, or acceleration pedal, to prevent a thief from properly stopping, steering, or accelerating the vehicle. Devices are also known that may be secured to the gear shift to prevent a thief from shifting the automobile out of "Park".

While prior devices are generally effective in preventing a thief from operating the automobile once he or she has entered the vehicle, they often fail to provide the deterrent necessary to discourage the thief from damaging the automobile when he or she attempts to enter the automobile. That is, these products do not sufficiently signal the thief that any attempt to steal the automobile will be futile. As such, thieves often break windows and destroy car locks, only to find they cannot operate the automobile due to the theft prevention device. However, these devices do not limit the thieves' access to the seating area and a thief is, therefore, provided with a work space in which he or she may steal objects stored within or on the front instrument panel and dashboard.

In addition, these products fail to prevent a thief from stealing goods stored within the automobile, for example, air bags, a stereo system or any goods stored within the glove box. Since they are merely secured to the functional components of the automobile, the prior theft prevention devices leave the passenger compartment fully open. As a result, a thief is provided with full access to sit in the seat of the passenger compartment where he or she may steal air bags, stereo equipment, or goods stored in the glove box, despite the fact that the automobile cannot be stolen. The term "passenger compartment" is used throughout the remainder of this disclosure and should be understood to refer to the space between the front instrument panel and dashboard and the front seats of the vehicle. As such, the "passenger compartment" includes, but is not limited to, the seating area, the driver seat, the passenger seat, leg space, the glove compartment, the stereo console and the steering column.

More sophisticated theft prevention devices are also known in the prior art. These devices are commonly based upon complex electronic control systems. Devices of this type generally prevent unauthorized use of the automobile by disabling the car during ignition or after the thief has driven the automobile for a short time. In addition, these devices may also send a warning signal so the automobile owner can locate the stolen vehicle. As with the theft prevention devices discussed above, these electronic devices fail to provide the deterrent necessary to prevent a thief from attempting to steal the automobile. They also leave the passenger compartment open, providing the thief with access to the air bags, stereo equipment and other goods stored in the passenger compartment. Electronic theft prevention devices are also expensive and are often difficult to incorporate into previously existing automobiles. As with prior mechanical theft prevention devices, electronic theft prevention devices do not limit a would-be thief's access to the passenger compartment of the automobile. The thief is, therefore, provided with a work area in which he or she is provided full access to the front instrument panel and dashboard of the vehicle.

As a review of the prior art reveals, a need continues to exist for a cost effective theft prevention device which prevents theft of the automobile and substantially limits access to the passenger compartment of the automobile. The present invention provides such a device.

SUMMARY OF THE INVENTION

It is, therefore, an object of the present invention to provide a theft prevention device for vehicles employing a powered seat system to automatically control the position of a vehicle seat movably situated on parallel guide rails to enable the seat to move forwardly or rearwardly. The vehicle seat includes a seat member and a lumbar support member, which move independent of one another. The theft prevention device includes a security module integrated with the powered seat system. The security module is programmed to instruct the powered seat system to move the vehicle seat between an original position and a forward security position with the seat member and lumbar support member moved forward to prevent a thief from accessing the passenger compartment of the vehicle. The theft prevent device further includes a gearing mechanism linking the seat member and the lumbar support member for controlled forward movement of the lumbar support member to a fully forward position flush with a forward most position within a passenger compartment of the vehicle. Selective actuation of the security module causes the security module to instruct the powered seat system to move the seat member forward along the guide rails and rotate the lumbar support member fully forward from its original position to a security position flush with the forward most position within a passenger compartment of the vehicle and causes the security module to instruct the powered seat system to move the seat member and lumbar support member back to their original positions.

It is till another object of the present invention to provide a theft prevention device for vehicles employing a powered seat system to automatically control the position of a vehicle seat movably situated on parallel guide rails to enable the seat to move forwardly or rearwardly, wherein the vehicle seat includes a seat member and a lumbar support member, which move independent of one another. The theft prevention device includes a security module integrated with the powered seat system. The security module is programmed to instruct the powered seat system to move the vehicle seat between an original position and a forward security position with the seat member and lumbar support member moved forward to prevent a thief from accessing the passenger compartment of the vehicle. The theft prevention device further includes a trigger switch linked to the security module for sending a trigger event signal instructing the security module when an individual leaves the vehicle or when an individual returns to the vehicle. The trigger switch sends a first trigger event signal to the security module when an individual leaves the vehicle and a second trigger event signal when the individual returns to the vehicle. Initiation of the first trigger event signal causes the security module to instruct the powered seat system to move the seat member forward along the guide rails and rotate the lumbar support member forward from its original position to a forward security position, and initiation of the second trigger event signal causes the security module to instruct the powered seat system to move the seat member and lumbar support member back to their original positions. The security module further includes a power switch connected to a vehicle electric power system for selectively connecting or disconnecting power from the vehicle electric power system circuit, whereby, when the seat member and lumbar support member are in the forward security position, the power switch is disconnected from the vehicle electric power system circuit thereby preventing a thief from activating the power switch during a break in of the vehicle.

It is also an object of the present invention to provide a vehicle including the the theft prevention device described above.

Other objects, advantages and salient features of the invention will become apparent from the following detailed description, which taken in conjunction with the annexed drawings, discloses a preferred, but non-limiting, embodiment of the subject invention.

DESCRIPTION OF THE PREFERRED EMBODIMENTS

The detailed embodiments of the present invention are disclosed herein. It should be understood, however, that the disclosed embodiments are merely exemplary of the invention, which maybe embodied in various forms. Therefore, the details disclosed herein are not to be interpreted as limiting, but merely as the basis for the claims and as a basis for teaching one skilled in the art how to make and/or use the invention.

Figure 1:
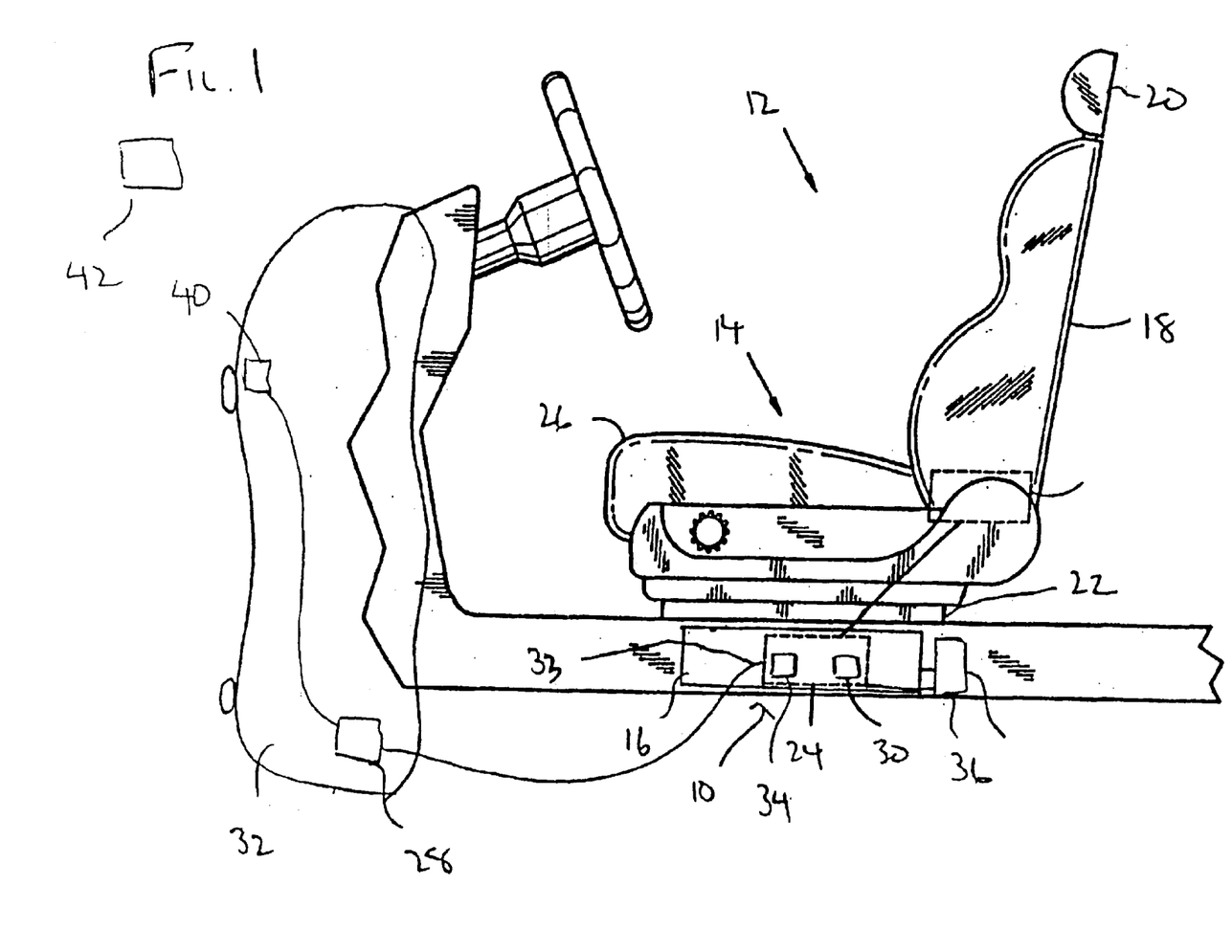
FIG. 1 is a side view of the present theft prevention device employed for use with vehicles having seat patterning systems.
Figure 2:
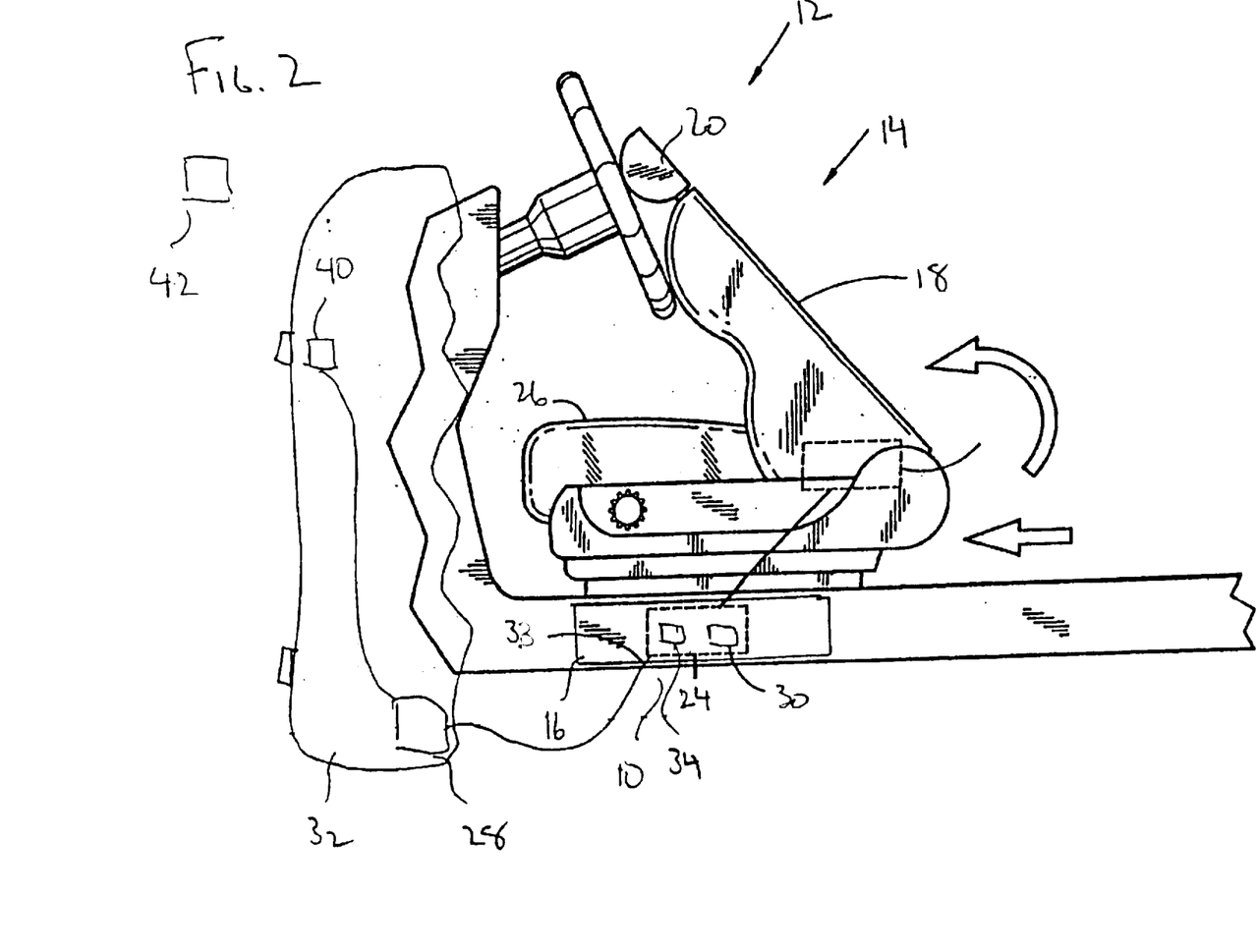
FIG. 2 is a side view of the embodiment disclosed in FIG. 1 showing the device when the seat member and lumbar support member are fully moved forward.

With reference to FIGS. 1 and 2, the present theft prevention device 10 is disclosed for use within a vehicle 12. The term "vehicle" is used throughout this disclosure and is intended to include cars, automobiles, trucks and other transportation devices that may incorporate the present invention in a useful manner.

Use of the present theft prevention device 10 creates an environment that protects a vehicle 12 from theft and deters a thief from attempting to steal the vehicle 12. By locking either, or both, the passenger and driver side seats adjacent the front instrument panel and dashboard of the vehicle 12, a would-be thief is not able to enter the passenger compartment to drive the vehicle or steal other objects contained within the passenger compartment. That is, the locked vehicle seats 14 protect the glove compartment, stereo equipment, steering wheel and air bags.

The present theft prevention device 10 is particularly adapted for application within vehicles including power seats 14 (whose forward and rearward movement is controlled by a series of controls hidden from the vehicle occupants' view) and seat patterning systems 16 in a manner permitting a vehicle seat 14 to be moved to a forward position when a driver leaves the vehicle 12 unattended and return to a comfortable seating position when the driver returns to his or her vehicle 12. Most vehicles offering seat patterning systems 16 including the ability to move the vehicle seat 14 forward and rearward, also provide for the automatic rotation of the lumbar support member 18 and headrest 20. In accordance with the present invention, the seat patterning systems 16 of these vehicles 12 are combined with the present theft prevention device 10 to provide a security system in which a vehicle seat 14 is selectively moved fully forward and the lumbar support member 18 and headrest 20 are rotated forward to prevent access to the passenger compartment of the vehicle 12.

While the present invention is described herein with reference to a vehicle including a seat patterning system, it is contemplated that the present invention may be employed with vehicles that do not include a traditional seat patterning system. Specifically, some vehicles include power seats, but do not include a patterning system. It is envisioned that these vehicles may be retroengineered to include a "chip" allowing the seat to be moved in accordance with the present invention.

As the present theft protection device 10 is integrated with existing seat patterning systems 16, the present security device allows for automated and controlled forward movement of vehicle seats 14 to a security position on parallel seat rails 22.

In general, the present theft prevention device 10 integrates an existing seat patterning system 16 with a security module 24 to automatically control the position of a vehicle seat 14 movably situated on parallel guide rails 22. In accordance with a preferred embodiment of the present invention, the vehicle seat 14 includes a seat member 26 and a lumbar support member 18, which move independently of one another. Other vehicles may also include a headrest 20 that is moved independently of both the lumbar support member 18 and the seat member 26.

As mentioned above, the security module 24 is integrated with the seat patterning system 16. The security module 24 is programmed to instruct the seat patterning system 16 to move the vehicle seat 14 between an original position (see FIG. 1) and a forward security position with the seat member 26, lumbar support member 18 and headrest 20 moved fully forward to prevent a thief from accessing the passenger compartment of the vehicle 12 (see FIG. 2). The system 10 further includes a trigger switch 28 linked to the security module 24 for sending a trigger event signal instructing the security module 24 when an individual leaves the vehicle 12 or when an individual returns to the vehicle 12. The trigger switch 28 sends a first trigger event signal to the security module 24 when the individual opens the vehicle door 32, leaves the vehicle 12 and closes the door 32, and a second trigger event signal when the individual returns to the vehicle 12 and either opens the door 32 with a key or uses a remote control 42. As discussed below in greater detail, use of the trigger switch may be supplemented through the use of a remote control 42 designed to actuate the trigger switch 28, and ultimately the security module 24, in a controlled manner.

Initiation of the first trigger event signal causes the security module 24 to instruct the seat patterning system 16 to move the vehicle seat 14 forward along the parallel guide rails 22 of the vehicle 12 and rotate the lumbar support member 18 forward from its original position to a forward security position. Initiation of the second trigger event signal causes the security module 24 to instruct the seat patterning system 16 to move the seat member 26 and lumbar support member 18 back to their original positions.

Specifically, seat patterning systems 16 employed in currently available vehicles 12 allow a vehicle seat 14 (including the seat member 26, the lumbar support member 18 and sometimes the headrest 20) to automatically move between predetermined positions when actuated. The present invention employs an integrated theft protection device 10 which moves the vehicle seat 14 to a forward security position; that is, the seat member 26, lumbar support member 18 and headrest 20 (where available) are moved fully forward as shown in FIG. 2. As discussed above, access to the passenger compartment is substantially limited when the vehicle seat 14 is placed in this forward position.

The present theft protection device 10 is integrated with the seat patterning system 16 to automatically move the seat member 26, lumbar support member 18 and headrest 20 forward. This forward movement may be performed individually or simultaneously and ultimately moves the vehicle seat 14 to its fullest forward extent as discussed above and shown in FIG. 2. The present theft protection device 10 is also provided with the ability to reverse seat 14 motion from the fully forward position shown in FIG. 2, returning the vehicle seat 14 to its preadjusted position (see FIG. 1). Movement of the vehicle seat 14 in this way may be applied to either or both the driver side seat and passenger side seat.

As briefly mention above, the present theft protection device 10 includes a security module 24 integrated with the seat patterning system 16 so as to permit the initiation of an actuation signal when a specific start event is triggered. The security module 24 includes a security controller 30 which functions to transmit the appropriate actuation signal to the seat patterning system 16.

Identification of a start event is achieved via the use of a trigger switch 28 mounted within the vehicle. As will be discussed below in greater detail, the trigger switch is capable of sensing opening of the vehicle door 32, closing of the vehicle door 32 and/or actuating of the key lock 40 by an individual entering the vehicle. The trigger switch 28 may also be actuated via a remote control 42 so as to supplement operation of the present system.

The trigger switch 28 is linked to an input 33 and processor 34 of the security module 24. As such, and as mentioned above, the start event is initiated upon the occurrence of a trigger event (for example, closing the vehicle door 32 upon departure from the vehicle 12, opening the vehicle door 32 by, for example, turning a key prior to opening the vehicle door 32 and/or actuating a remote control 42). The trigger switch 28 sends a signal to the security module 24. The security module 24 identifies the event and instructs the security controller 30 to send an appropriate actuation signal to the seat patterning system 16. The actuation signal instructs the seat patterning system 16 to move the vehicle seat 14 forward to a security position or to move the vehicle seat 14 rearwardly to a seating position.

With this in mind, the trigger switch 28 is programmed to provide both a first trigger event signal and a second trigger event signal. The trigger switch 28 sends the first trigger event signal to the security module 24 when an individual leaves the vehicle 12 (i.e., when the seat 14 is to be moved to its security position) and the second trigger event signal when the individual returns to the vehicle 12 and either opens the door with a key or uses the remote control 42 (i.e., when the seat is to be moved back to its original operating position).

While a preferred embodiment of the present invention employs a trigger switching mechanism within the vehicle, those skilled in the art will appreciate that other mechanisms for sensing when an individual leaves and returns to his or her vehicle are known to those skilled in the art and would be appropriate for use in accordance with the present invention. For example, the trigger switch may be located at other positions within a vehicle, for example, the trigger switch may be located in the trunk such that opening and closing of the trunk actuates the present system. Similarly, the switching mechanism may be actuated via a mini receiver/transmitter (i.e., remote control 42). It is contemplated that such a device will be small enough to be held in the wallet of a user, and may be used to open the vehicle doors and move the seats back to their unsecured position in the event the user is otherwise unable to gain access to the vehicle.

In use, the present theft protection device 10 functions in the following manner. Upon an individual exiting a vehicle 12 and closing the vehicle door 32, the trigger switch 28 in the vehicle door 32 sends a first trigger event signal to the security module 24. The security module 24 identifies the signal as indicating that the individual is leaving the vehicle 12 and instructs the security controller 24 to send a signal to the seat patterning system 16 instructing the seat patterning system 16 to move the seat member 26, lumbar support member 18 and headrest 20 to the forward position shown in FIG. 2. As there maybe an undesirable lag time between the closure of the door 32 and the movement of the seat member 26, lumbar support member 18 and headrest 20 to the forward security position, the individual may actuate a remote control 42 which would quickly move the seat member 26, lumbar support member 18 and headrest 20 to the security position.

When the individual returns to his or her vehicle 12, the trigger switch 28 is triggered once again by use of the remote control 42 or by inserting and turning a key within the key lock 40, sending a second trigger event signal to the security module 24 to instruct the seat patterning system 16 to move the vehicle seat 14 back to its original position.

Figure 3:
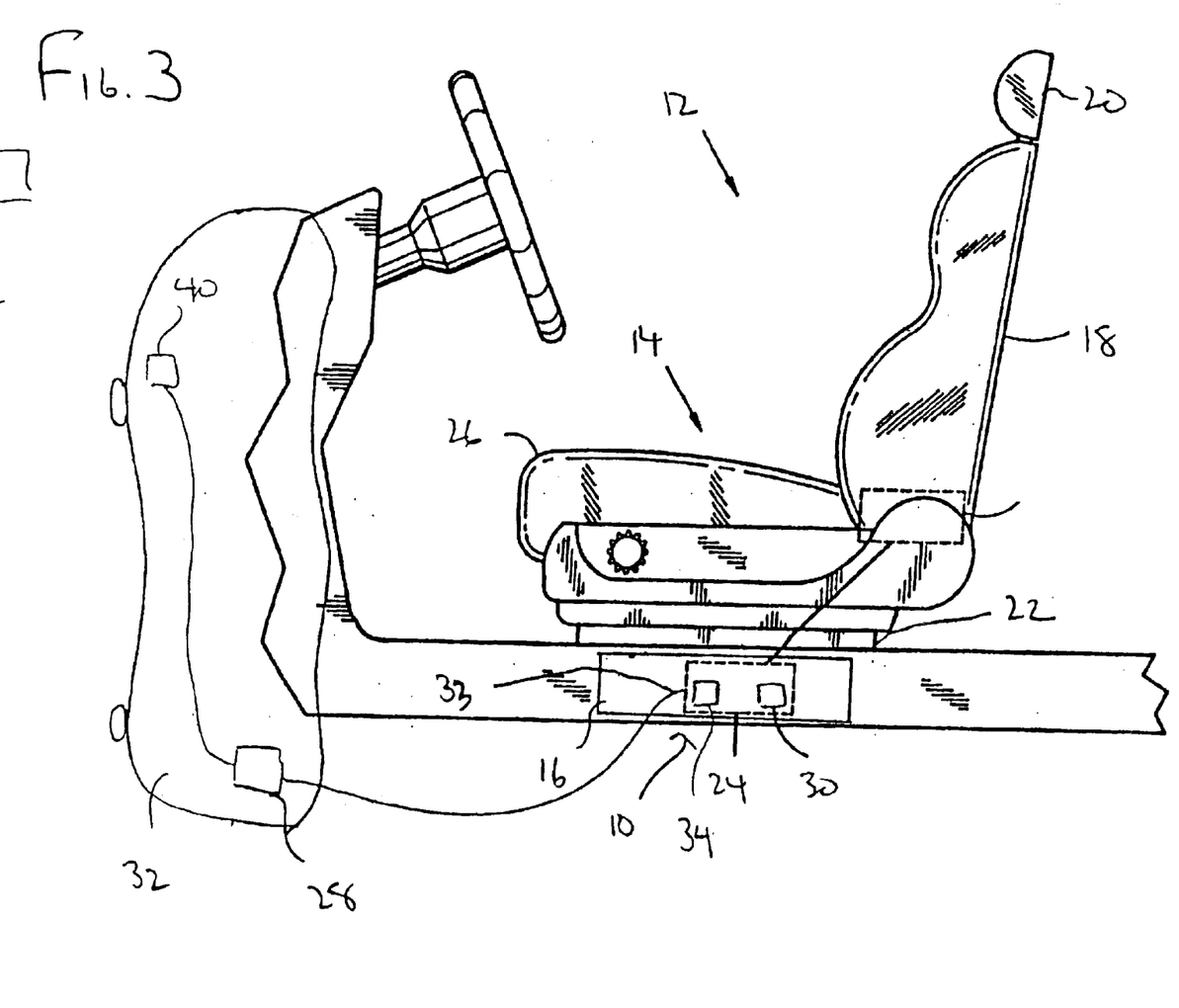
FIG. 3 is a side view of an alternate embodiment of the present theft prevention device employed for use with vehicles having seat patterning systems.

In accordance with a further embodiment of the present invention, and as shown in FIG. 3, the present theft protection device 10 maybe provided with a power switch 36 linked to the security module 24 and the seat patterning system 16. The power switch 36 provides for the connection and/or disconnection of power to the seat patterning system 16 when the vehicle seat 14 is in its security position.

More specifically, when the security module 24 instructs the seat patterning system 16 to move the vehicle seat 14 forward to the position shown in FIG. 2, the power switch 36 is actuated to turn power to the seat patterning system 16 off once the movement to the forward security position is complete. In this position, a potential thief, upon breaking into the vehicle 12, has no room to manipulate the wheel or the gas and brake pedals and, therefore, is unable to drive the vehicle 12 away. When the individual returns to his or her vehicle 12, and the second trigger event is actuated for returning the vehicle seat 14 to its original position, the power switch 36 is actuated to return power to the seat patterning system 16, thereby allowing the vehicle seat 14 to be moved rearwardly to its original position.

It is emphasized again that once the seat member 26, lumbar support member 18 and headrest 20 arrive at the forward security position, the power switch 36 disconnects power from the seat patterning system 16 thereby preventing a would-be thief from using the seat patterning system 16 to move the vehicle seat 14 back to its original position.

Incorporation of the theft prevent system described above is limited to vehicles having seats which can be moved to the desired forward position. As those skilled in the art will certainly appreciate, most seats do not provide the ability for moving the lumbar support member 18 fully forward. That is, most seats do not provide the ability for rotating the lumbar support member 18 flush with either the steering wheel or the dashboard of the vehicle 12.

Figure 4:
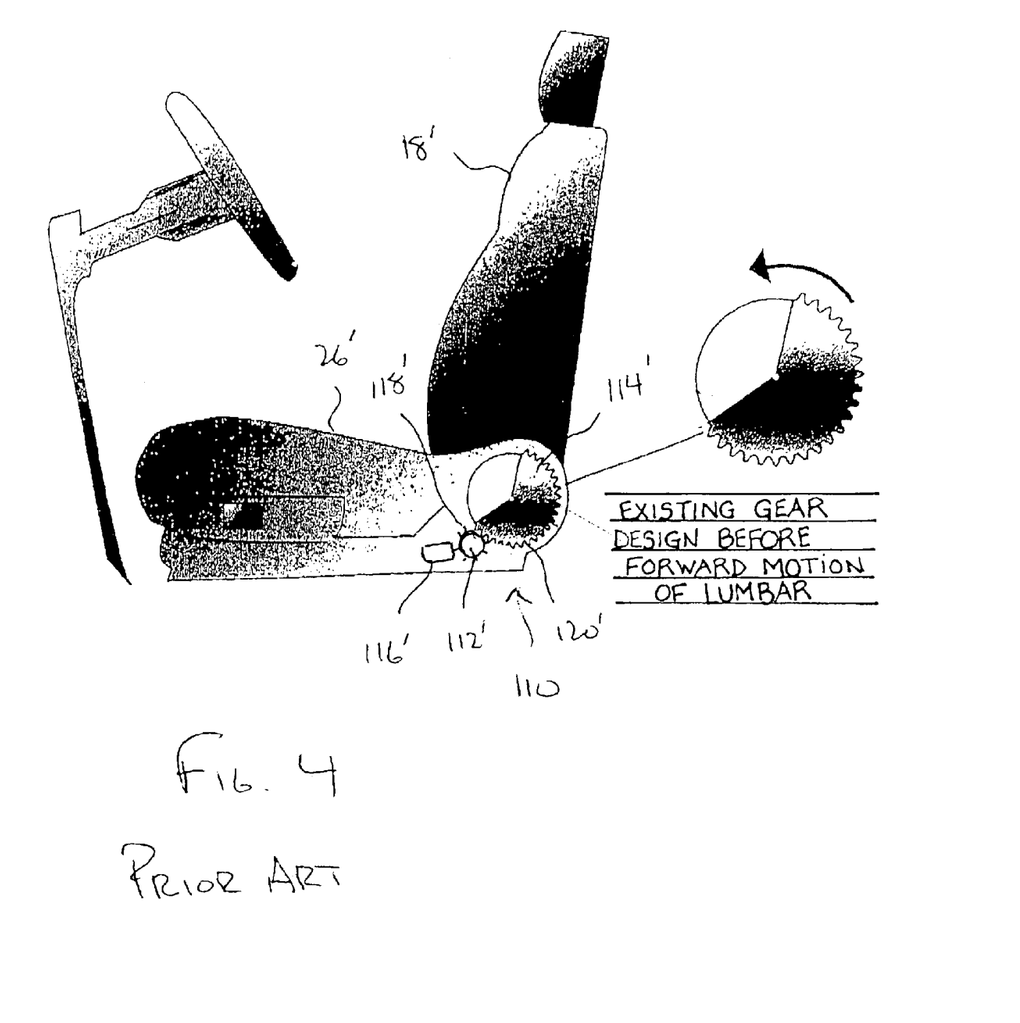
FIG. 4 is a schematic of a conventional prior art gearing mechanism for a motor vehicle. The schematic shows the lumbar support member in its central position commonly used while driving the vehicle.
Figure 5:
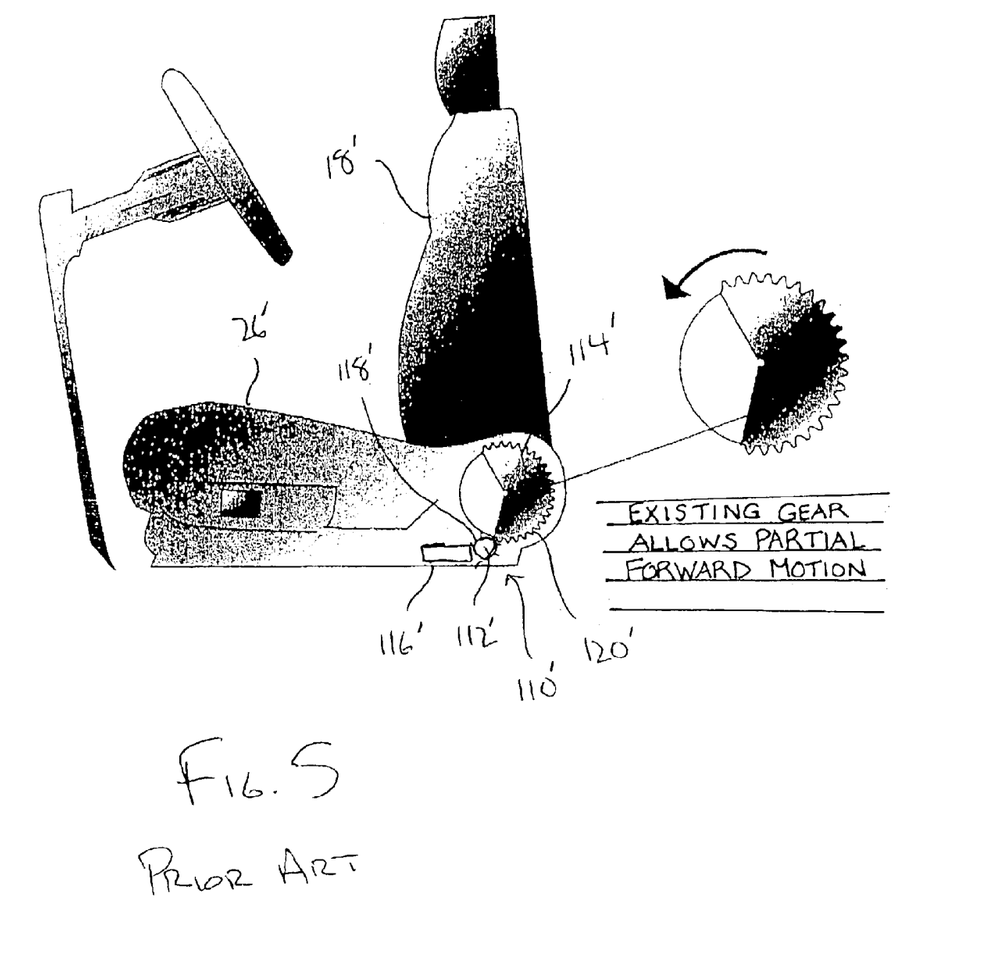
FIG. 5 is a schematic of the gearing mechanism shown in FIG. 4, with the lumbar support member rotated to its forward most position based upon the limited arc of the driven gear.

More particularly, and with reference to FIGS. 4 and 5, a schematic of a prior art gearing mechanism 110' used in controlling the movement of a lumbar support member 18' relative to a seat member 26' is shown. The gearing mechanism 110' generally relies upon the interaction between a driven gear 112' secured to the seat member 26' and a lumbar gear 114' secured to the lower portion of the lumbar support member 18'. In use, and as those skilled in the art will certainly appreciate, the driven gear 112' is rotated under the control of a motor 116'. Since the gear teeth 118' of the driven gear 112' are engaged with the gear teeth 120' of the lumbar gear 114', rotation of the driven gear 112' causes selective rotation of the lumbar gear 114' and ultimately the lumbar support member 18' secured thereto.

As shown in FIGS. 4 and 5, lumbar gears 114' as utilized in accordance with the prior art include teeth 120' about only a limited portion of an arc. In particular, lumbar gears 114' include teeth 120' only over an arc of approximately 120°. As such, the lumbar gears 114' are only capable of rotating the lumbar support member 18' through a limited range of motion as shown in FIGS. 4 and 5.

Figure 6:
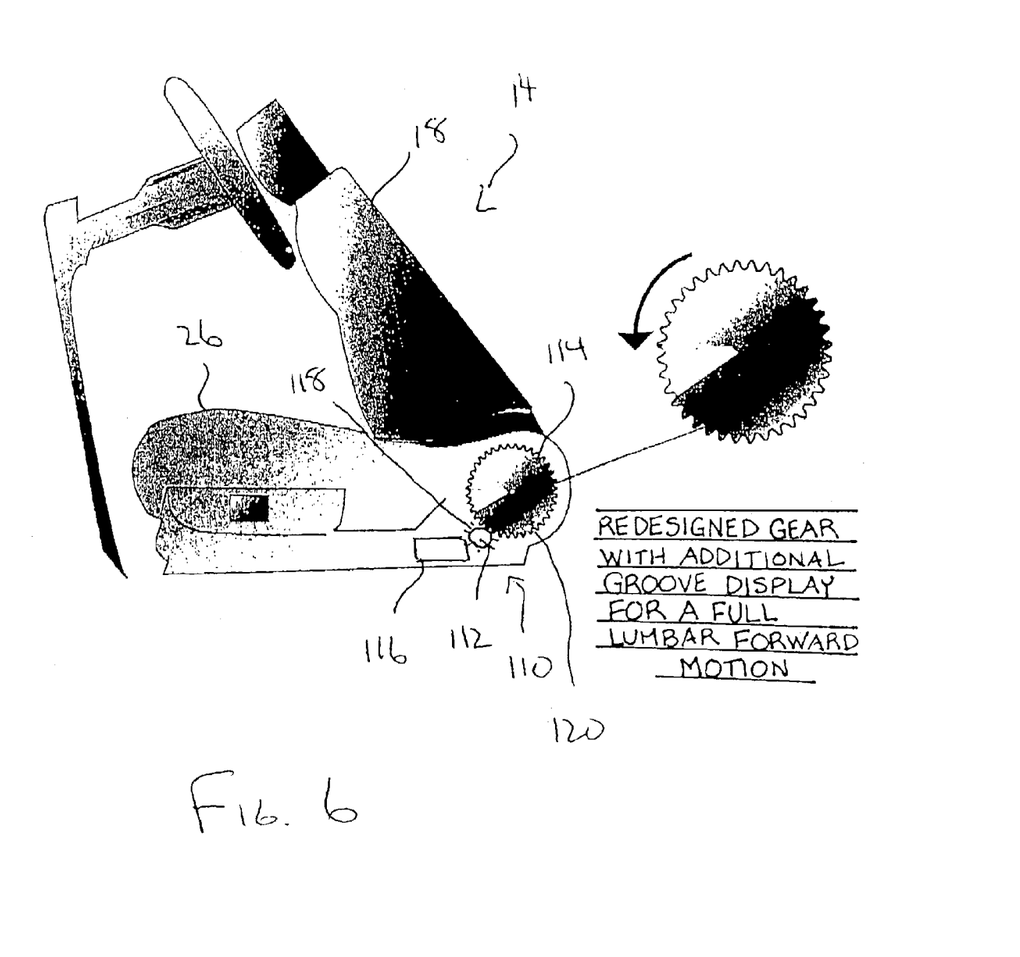
FIG. 6 is a schematic of a gearing mechanism in accordance with the present invention.

With reference to FIG. 6, the present invention overcomes this deficiency in the prior art by providing a vehicle seat 14 including a gearing mechanism 110 which permits rotation of the lumbar support member 18 to a fully forward position flush with the steering wheel or the dashboard of the vehicle 12. As discussed above, the seat member 26 and the lumbar support member 18 are pivotally connected via a hinge (not shown). This hinge permits the seat member 26 and the lumbar support member 18 to rotate relative to each other under the control of the present gearing mechanism 110.

The gearing mechanism 110 generally relies upon the interaction between a driven gear 112 secured to the seat member 26 and a lumbar gear 114 secured to the lower portion of the lumbar support member 18. In use, the driven gear 112 is rotated under the control of a motor 116. Since the gear teeth 118 of the driven gear 112 are engaged with the gear teeth 120 of the lumbar gear 114, rotation of the driven gear 112 causes selective rotation of the lumbar gear 114' and ultimately the lumbar support member 18' secured thereto.

As described above, the gearing mechanism 110 herein may be applied to both the driver side seat or the passenger side seat. Similarly, the present theft prevention device may be applied to other seating arrangements, wherein theft prevention will be deterred through forward movement of the seat, without departing from the spirit of the present invention.

With reference to FIG. 6, the gearing mechanism 110 includes a lumbar gear 114 with teeth 120 extending over a substantial portion of the arc defined by the lumbar gear 114. In accordance with a preferred embodiment, the lumbar gear 114 includes teeth 120 over an arc substantially greater then that provided in accordance with prior art. In accordance with a preferred embodiment of the present invention, the number of additional teeth 120 to be added to the lumbar gear 114 either in a retrofit or new gear wheel will vary depending upon the make and manufacturer of the vehicle. The number of additional teeth 120 will be based upon those necessary to facilitate full forward rotation of the lumbar support member 18. In addition, and as those skilled in the art will certainly appreciate, the number of teeth 120 will be dependent upon the size of the seat back, the length of the lumbar region of the seat back and the width of the seat in relation to the steering wheel. The extent of the teeth 120 utilized in accordance with the present invention facilitate full forward rotation of the lumbar support member 18 relative to the seat member 26.

By expanding the extent of teeth 120 upon the lumbar gear 114 of the present gearing mechanism 110, the lumbar support member 18 maybe rotated to a fully forward position flush with either the steering wheel or the dashboard. In this way, the present anti-theft security position discussed above can be achieved by movement of the lumbar support member. It is contemplated the present gearing mechanism may be added to new vehicles or may be retrofit to existing vehicles.

While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A theft prevention device for vehicles employing a powered seat system to automatically control the position of a vehicle seat movably situated on parallel guide rails to enable the seat to move forwardly or rearwardly, wherein the vehicle seat includes a seat member and a lumber support member and a lumbar support member, which move relative to one another, the theft prevention device comprising:

a security module integrated with the powered seat system, the security module being programmed to instruct the powered seat system to move the vehicle seat between an original position and a forward security position with the seat member and lumbar support member moved forward to prevent a thief from accessing a passenger compartment of the vehicle; and a gearing mechanism linking the seat member and the lumbar support member for controlled forward movement of the seat member and the lumbar support member to the forward security position flush with a forward most position within the passenger compartment of the vehicle, wherein the gearing mechanism includes a lumbar gear with teeth over an arc distance sufficient to facilitate full forward rotation of the lumbar support member to the forward security position flush with the forward most position within the passenger compartment of the vehicle;

wherein selective actuation of the security module causes the security module to instruct the powered seat system to move the seat member forward along the guide rails and rotate the lumbar support member fully forward from its original position to the forward security position flush with the forward most position within the passenger compartment of the vehicle and causes the security module to instruct the powered seat system to move the seat member and lumbar support member back to their original positions.

2. The theft prevention device according to claim 1, further including a trigger switch linked to the security module for sending a trigger event signal instructing the security module when an individual leaves the vehicle or when an individual returns to the vehicle, the trigger switch sending a first trigger event signal to the security module when the individual leaves the vehicle and a second trigger event signal when the individual returns to the vehicle;

wherein initiation of the first trigger event signal causes the security module to instruct the powered seat system to move the seat member forward along the guide rails and rotate the lumbar support member fully forward from its original position to the forward security position flush with forward most position within the passenger compartment of the vehicle, and initiation of the second trigger event signal causes the security module to instruct the powered seat system to move the seat member and lumbar support member back to their original positions.

3. The theft prevention device according to claim 2, wherein the trigger switch is associated with a door of the vehicle.

4. The theft prevention device according to claim 3, wherein the first trigger event signal is initiated upon closing of the vehicle door after the ignition has been turned off.

5. The theft prevention device according to claim 3, wherein the second trigger event signal is initiated upon the opening of the vehicle door.

6. A vehicle provided with a theft prevention device comprising a powered seat system to automatically control the position of a vehicle seat movably situated on parallel guide rails to enable the seat to move forwardly or rearwardly, wherein the vehicle seat includes a seat member and a lumbar support member, which move relative to one another, the theft prevention device comprising:

a security module integrated with the powered seat system, the security module being programmed to instruct the powered seat system to move the vehicle seat between an original position and a forward security position with the seat member and the lumbar support member moved forward to prevent a thief from accessing a passenger compartment of the vehicle; and a gearing mechanism linking the seat member and the lumbar support member for controlled forward movement of the seat member and the lumbar support member to the forward security position flush a forward most position within the passenger compartment of the vehicle, wherein the gearing mechanism includes a lumbar gear with teeth over an arc distance sufficient to facilitate full forward rotation of the lumbar support member to the forward security position flush with the forward most position with the passenger compartment of the vehicle;

wherein selective actuation of the security module causes the security module to instruct the powered seat system to move the seat member forward along the guide rails and rotates the lumbar support member fully forward from its original position to the security position flush with the forward most position within the passenger compartment of the vehicle and causes the security module to instruct the powered seat system to move the seat member and lumbar support member back to their original positions.

7. The theft prevention device according to claim 6, further including a trigger switch linked to the security module for sending a trigger event signal instructing the security module when an individual leaves the vehicle or when an individual returns to the vehicle, the trigger switch sending a first trigger event signal to the security module when the individual leaves the vehicle and a second trigger event signal when the individual returns to the vehicle;

wherein initiation of the first trigger event signal causes the security module to instruct the powered seat system to move the seat member forward along the guide rails and rotate the lumbar support member fully forward from its original position to the forward security position flush with the forward most position within the passenger compartment of the vehicle, the initiation of the second trigger event signal causes the security module to instruct the powered seat system to move the seat member and lumbar support member back to their original positions.

8. The vehicle according to claim 7, wherein the security module includes a security controller instructing the powered seat system.

9. The vehicle according to claim 7, wherein the trigger switch is associated with a door of the vehicle.

10. The vehicle according to claim 9, wherein the first trigger event signal is initiated upon closing of the vehicle door after the ignition has been turned off.

11. The vehicle according to claim 9, wherein the second trigger event signal is initiated upon the opening of the vehicle door.

12. The vehicle according to claim 7, wherein the powered seat system is a seat patterning system.

13. A theft prevention device for vehicles employing a powered seat system to automatically control the position of a vehicle seat movably situated on parallel guide rails to enable the seat to move forwardly or rearwardly, wherein the vehicle seat includes a seat member and a lumbar support member, which move relative to one another, the theft prevention device comprising:

a security module integrated with the powered seat system, the security module being programmed to instruct the powered seat system to move the vehicle seat between an original position and a forward security position with the seat member and lumbar support member moved forward to prevent a thief from accessing the passenger compartment of the vehicle; and a gearing mechanism linking the seat member and the lumbar support member for controlled forward movement of the seat member and the lumbar support member to the forward security position flush with a forward most position within the passenger compartment of the vehicle, wherein the gearing mechanism includes a lumbar gear with teeth over an arc distance sufficient to facilitate full forward rotation of the lumbar support member to the forward security position flush with the forward most position within the passenger compartment of the vehicle;

a trigger switch linked to the security module for sending a trigger signal instructing the security module with an individual leaves the vehicle or when an individual returns to the vehicle, the trigger switch sending a first trigger event signal to the security module when the individual leaves the vehicle and a second trigger event signal when the individual returns to the vehicle;

wherein initiation of the first trigger event signal causes the security module to instruct the powered seat system to move the seat member forward along the guide rails and rotate the lumbar support member forward from its original position to the forward security position, and initiation of the second trigger event signal causes the security module to instruct the powered seat system to move the seat member and lumbar support member back to their original positions; and the security module further including a power switch connected to a vehicle electric power system for selectively connecting or disconnecting from the vehicle power system circuit, whereby, when the seat member and lumbar support member are in the forward security position, the power switch is disconnected from the vehicle electric power system circuit thereby preventing the thief from activating the power switch during a break in of the vehicle.

14. The theft prevention device according to claim 13, wherein the security module includes a security controller instructing the powered seat system.

15. The theft prevention device according to claim 13, where the trigger switch is associated with a door of the vehicle.

16. The theft prevention device according to claim 15, wherein the first trigger event signal is initiated upon closing of the vehicle door after the ignition has been turned off.

17. The theft prevention device according to claim 15, wherein the second trigger event signal is initiated upon the opening of the vehicle door.

18. A vehicle provided with a theft prevent device comprising:

a powered seat system to automatically control the position of a vehicle seat movably situated on parallel guide rails to enable the seat to move forwardly or rearwardly, when the vehicle seat includes a seat member and a lumbar support member, which move relative to one another, the theft prevention device comprising:

a security module integrated with the powered seat system, the security module being programmed to instruct the powered seat system to move the vehicle seat between an original position and a forward security position with the seat member and lumbar support member moved forward to prevent a thief from accessing a passenger compartment of the vehicle; and a gearing mechanism linking the seat member and lumbar support member for controlled forward movement of the seat member and the lumbar support member to the forward security position flush with a forward most position within the passenger compartment of the vehicle, wherein the gearing mechanism included a lumbar gear with teeth over an arc distance sufficient to facilitate full forward rotation of the lumbar support member to the forward security position flush with the forward most position with the passenger compartment of the vehicle;

a trigger switch linked to the security module for sending a trigger event signal instructing the security module when an individual leaves the vehicle or when an individual returns to the vehicle; the trigger switch sending a first trigger event signal to the security module when the individual leaves the vehicle and a second trigger event signal when the individual returns to the vehicle;

wherein initiation of the first trigger signal causes the security module to instruct the powered seat system to move the seat member forward along the guide rails and rotate the lumbar support member forward from its original position to the forward security position, and initiation of the second trigger event signal causes the security module to instruct the powered seat system to move the seat member and lumbar support member back to their original positions; and the security module further including a power switch connected to a vehicle electric power system for selectively connecting or disconnecting power from the vehicle electric power system circuit, whereby, when the seat member and lumbar support member are in the forward security position, the power switch is disconnected from the vehicle electric power system circuit thereby preventing the thief from activating the power switch during a break in of the vehicle.

19. The vehicle according to claim 18, wherein the security module includes a security controller instructing the powered seat system.

20. The vehicle according to claim 18, where the trigger switch is associated with a door of the vehicle.

21. The vehicle according to claim 20, wherein the first trigger event signal is initiated upon closing of the vehicle door after the ignition has been turned off.

22. The vehicle according to claim 18, wherein the second trigger event signal is initiated upon the opening of the vehicle door.

23. The vehicle according to claim 18, wherein the powered seat system is a seat patterning system.

* * * * *